United States Patent [19]

Kondo et al.

[11] 4,323,257
[45] Apr. 6, 1982

[54] PISTON RING WITH A CR-C-FE INLAID RING IN ITS OUTER SURFACE, AND A METHOD OF MAKING IT

[75] Inventors: Katsumi Kondo; Yoshio Huwa; Syouzi Miyazaki, all of Toyota, Japan

[73] Assignee: Toyota Jidosha Kogyo Kabushiki Kaisha, Aichi, Japan

[21] Appl. No.: 63,037

[22] Filed: Aug. 2, 1979

[30] Foreign Application Priority Data

Nov. 20, 1978 [JP] Japan .................................. 53-143000

[51] Int. Cl.$^3$ ................................................ F16J 9/00
[52] U.S. Cl. .................................. 277/224; 277/235 R
[58] Field of Search ......................... 277/223, 224, 235

[56] References Cited

U.S. PATENT DOCUMENTS 3,606,359  9/1971  McCormick ......................... 277/224

FOREIGN PATENT DOCUMENTS 54-126854  10/1979  Japan .................................. 277/224

Primary Examiner—Robert I. Smith
Attorney, Agent, or Firm—Birch, Stewart, Kolasch & Birch

[57] ABSTRACT

A piston ring preform is formed with a groove dividing its cylindrical outer surface, and this groove is filled up by plasma-spraying with a deposit of alloy whose surface is flush with the cylindrical outer surface of the preform not deposited with alloy. The alloy is about 55%-70% Cr, about 3%-9% C, and balance Fe. In preferred embodiments the groove has a bottom and side walls which are inclined at at least 100° to one another, and a sub-layer composed of metal powder plasma-sprayed under the alloy deposit such that it adheres well to the bottom of the groove and which has good heat and oxidization resistance. The material of the preform may be cast iron, nodular graphite cast iron, or steel; and the material of the sub-layer may be a mixture of Ni and Al.

2 Claims, 12 Drawing Figures

PISTON RING WITH A CR-C-FE INLAID RING IN ITS OUTER SURFACE, AND A METHOD OF MAKING IT

BACKGROUND OF THE INVENTION

The present invention relates to a piston ring for use with a piston in an internal combustion engine, and more particularly relates to a surface structure for the cylindrical outer surface of the ring which slides on the cylinder or the cylinder liner of the engine and accordingly requires high wear and seizure resistance.

Thermal load has increased in modern internal combustion engines, due to their high rotational speed and their high compression ratios, which are employed in order to produce high performance and in connection with exhaust emission control. Thereby, more load is imposed on the mutually sliding areas of piston rings and cylinders. Especially, in diesel engines, the generation of carbon soot has increased the requirement for high seizure resistance, wear resistance, and scuffing resistance.

Conventional piston rings are known whose sliding surfaces are coated with chromium or molybdenum. Cr coated piston rings have good wear resistance, but they are prone to seize or scuff when used with cylinder liners made of cast iron. Mo coated piston rings have good seizure resistance, but when used in engines which subject them to high thermal load there is a tendency for oxidized layers to be formed in the boundary region between the piston ring mother metal (usually cast iron) and the deposited Mo layer, and also between the deposited metal particles, resulting in poor adherence of the deposited layer to the mother metal. Furthermore, Mo is expensive.

It has been proposed and practiced to produce piston rings which have several layers of coating on their outer cylindrical surfaces. For example, layers of Mo alloy and Fe alloy; layers of Mo alloy and ceramics; and layers of Fe alloy and ceramics. However, each of these combinations has both advantages and disadvantages, and such piston rings are not used very much at present in actual engines.

SUMMARY OF THE INVENTION

The object of the present invention is to provide an improved piston ring for use with a piston in an internal combustion engine, which not only has good wear and seizure resistance, but which is cheaper than a Mo deposited piston ring, and has a cost comparable with a Cr plated piston ring. A further object is to provide a method of forming such a piston ring.

According to the present invention, this first object is accomplished by a piston ring for use in an internal combustion engine, comprising a piston ring preform having a circumferential groove dividing its cylindrical outer surface, and a deposit of alloy which is plasma-sprayed into the groove and fills it up, with its surface flush with the cylindrical outer surface of the preform, the cylindrical outer surface of the preform not being deposited with alloy, said alloy being composed of about 55%–70% Cr, about 3%–9% C, and balance substantially Fe.

Further, according to the present invention, this further object is accomplished by a method for forming a piston ring for use in an internal combustion engine, comprising in order the steps of: (a) plasma-spraying a piston ring preform having a circumferential groove dividing its cylindrical outer surface, on its outer surface, with a deposit of alloy so that the groove is filled up, said alloy being composed of about 55%–70% Cr, about 3%–9% C, and balance substantially Fe; and (b) machining the outer surface of the ring, so that any deposit of alloy on the cylindrical outer surface of the preform is removed, and so that the deposit of alloy in the groove is made flush with the cylindrical outer surface of the preform.

According to a particular feature of the present invention, the bottom of this groove may, before the alloy is sprayed into the groove, be sprayed with a sub-layer of metal powder which adheres well to the bottom of the groove and which has a good oxidization resistance. This powder may be a mixture of Al and Ni, Ni-Al composite, or Ni-Al alloy, which promotes adhesion of the Cr-C-Fe layer.

The particular benefit of this invention partly arises from the fact that the Cr-C-Fe alloy deposited according to the present invention has better high temperature oxidization and anti-wearing resistance than Mo, and the powder alloy for spraying is commercially available at one tenth the cost of Mo. The powder may be 250 mesh or smaller.

The annular groove which is filled with the alloy preferably has a trapezoidal cross-section, with side walls which diverge from the bottom of the groove upwards to the cylindrical outer surface of the ring, so that the metal alloy, as it is being plasma-sprayed, directly impinges on the side walls, and so sticks well to them.

It has been an objective of the present inventors to determine the optimum angle between these side walls. We have discovered that the invention works best if this angle is 100° or more. Otherwise, the deposited layer does not adhere well to the side walls, and exfoliation occurs.

BRIEF DESCRIPTION OF THE DRAWINGS

The present invention will become more fully understood from the detailed description of several embodiments given hereinbelow, and the accompanying drawings. However, it is to be understood that the present invention is not to be limited by any details of the embodiments described, or of the drawings, which are all given by way of illustration only, but only by the appended claims. In the drawings:

DESCRIPTION OF THE PREFERRED EMBODIMENTS

The following examples are given in order to illustrate the effectiveness of the present invention, and are not intended to limit the scope of the invention in any way.

EXAMPLE I-1

Figure 1:
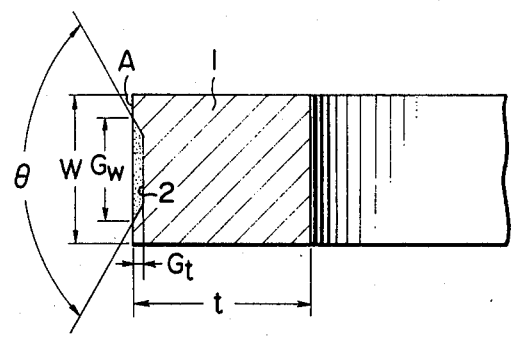
FIG. 1 is an enlarged radial cross sectional view of an embodiment of the piston ring according to the present invention.

A plurality of piston ring preforms (this word is used to mean the basic structure of a piston ring, before deposition of any coating or filling of any groove, both here and in the claims) made of nodular graphite cast iron were prepared. As shown in FIG. 1, each piston ring preform was formed with a circumferential annular groove dividing its outer cylindrical surface into two. The grooves were of trapezoidal cross-section. The piston rings were stacked on one another axially, and thus formed into a tubular assembly. While this assembly was rotated about its axis, alloy powder was spray deposited onto the outside of the assembly by the plasma spray process, so that the annular grooves were completely filled up with deposited alloy. The composition of the powder (all compositions, both here and in the claims, are by weight) was 63.3% Cr, 6.6% C, 1.9% Si, 0.02% P, 0.04% S, and balance substantially Fe. Subsequently, the cylindrical outer surface of the assembly was ground with a cylindrical grinder, and thus each piston ring was formed with the desired dimensions. This grinding removed all alloy from the outer circumferential surface of the preform, thus leaving the groove only filled with said alloy, and leaving the surface of the alloy in the groove flush with the outer cylindrical surface of the preform. The finished dimensions of the piston rings thus formed (see FIG. 1) were as follows:

Outer diameter (nominal): 90 mm
Thickness, t: 3 mm (i.e., length in radial direction)
Width, w: 2.5 mm (i.e., length in axial direction)
Angle between the walls of the annular groove, theta: 120°
Depth of the annular groove, Gt: 0.25 mm
Width of the annular groove, Gw: 1.7 mm The plasma spray process was performed using a "3MB" plasma spray machine commercially available from METCO, Inc. of U.S.A., fitted with a GH type nozzle and a No. 2 powder port also sold by the company. Spraying was done under the following conditions:

Ar gas flow rate: 2265.6 l/hr (80 SCFH)
H2 gas flow rate: 424.8 l/hr (15 SCFH)
Electric current: 450 A
Rotational speed of the assembly: 200–500 rpm
Feeding speed (speed of advancing the tubular assembly along its axis): 1.0–2.5 m/min
Flow rate of the alloy powder: 40 g/min The piston rings thus formed were installed on the pistons of a four cylinder diesel engine of 2.2 liter displacement. The engine was run on a laboratory bench for 300 hours under full load at 4400 rpm, with a cooling water temperature of 110° C., using engine oil of the brand "Dieselux", supplied by Toa Nenryo Kogyo Co., Ltd. of Japan. Then the piston rings were removed from the engine, examined, sectioned, and microscopically examined.

Figure 2:
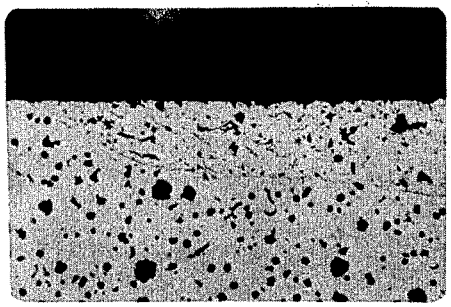
FIG. 2 is a micrograph (X100) showing a radial cross section of a piston ring according to the present invention.

The results of these examinations were satisfactory. FIG. 2 is a micrograph (X100) showing a cross-section of one of the rings. As will be appreciated, there are very few portions in the deposited layer which were oxidized or exfoliated. The results imply that the adherence of the deposited layer to the mother metal (nodular graphite cast iron) is excellent. Since adherence has a great effect of the durability of piston rings, and on the performance of an engine incorporating the piston rings, it is one of the most important properties that a piston ring must possess.

EXAMPLE I-2

Figure 3:
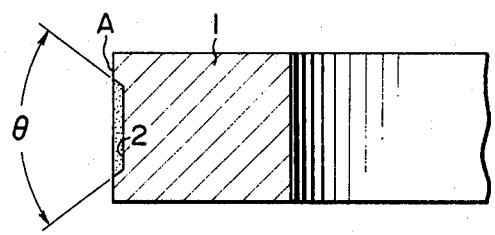
FIG. 3 is a view similar to FIG. 1, showing a piston ring with an angle between the side walls which is less than 100°.

For comparison, two kinds of samples were prepared. Two tubular assemblies were prepared of a plurality of the same piston ring preforms as in Example I-1, except for the angle between the walls of the groove, which was 60°, as shown in FIG. 3, and one of them was gas-deposited on its outer surface with molybdenum powder, and machined as in the previous example. The outer assembly was treated in the same way as in the previous example, and then two of the pistons in a diesel engine of the same sort as in the previous example were fitted with the molybdenum coated rings, and two were fitted with rings prepared in the same way as in the previous example. The engine was run in the same way as before, and the same examination was performed.

Figure 4:
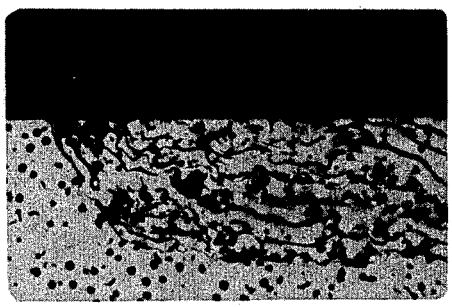
FIG. 4 is a micrograph (X100) showing a radial cross section of an Mo deposited piston ring.

In the Mo coated piston rings, as will be seen from FIG. 4, which is a micrograph (X100) showing a cross-section of an Mo deposited piston ring, oxidization occured much more in the regions between particles in the Mo deposited layer, rather than in the boundary between the Mo deposited layer and the piston ring preform material. By examination of the cylindrical sliding outer surface of the piston rings, exfoliation was also observed between particles in the deposited layer, and the amount of wear was three to four times as much as in the Cr-C-Fe alloy deposited piston rings. In the micrograph, the oxidized parts appear as dark portions in the deposited layer.

Figure 5:
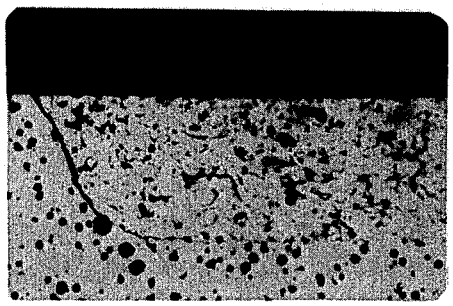
FIG. 5 is a micrograph (X100) showing a radial cross section of a piston ring, where Cr-C-Fe alloy has been deposited into a groove with an angle between the side walls which is less than 100°.

On the other hand, in the case of the Cr-C-Fe coated piston rings, the amount of wear was as little as 15 to 20 microns, and no exfoliation or cracks were observed in the cylindrical outer sliding surface. However, as is shown in FIG. 5, which is a micrograph (X100) of a cross-section of one of the samples, there was some oxidization or exfoliation between the deposited layer and the side walls of the annular groove.

EXAMPLE II

Figure 6:
FIG. 6 is a micrograph (X400) showing a radial cross section of a piston ring with an angle between the side walls which is 120°.

In order to determine the optimum angle between the walls of the groove, several piston ring preforms were made, having included angles of 60°, 80°, 100°, and 120°. Then, in the same way as in Example I-1, these preforms were plasma-sprayed with the same Cr-C-Fe alloy as used in Example I-1, and machined. Then, in order to test the adherence of the deposited layer to the mother metal, the piston rings were subjected to repeated heating and cooling cycles. In each cycle, the rings were heated by being maintained in an electric furnace at 300° C. for eight minutes. Then they were immersed in water for one minute. Then, after 250 cycles, the rings were sectioned along a diametrical plane, and micrographs of the sections were made. FIG. 6 is a micrograph (X400) showing a cross-section of one of the piston rings which had an included angle of 120°.

Figure 7:
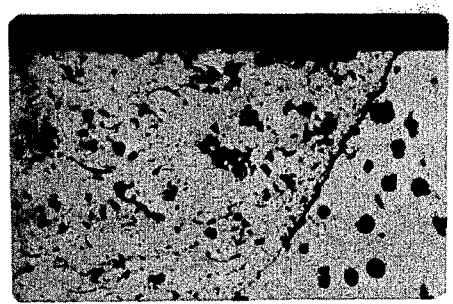
FIG. 7 is a micrograph (X200) showing a radial cross section of a piston ring with an angle between the side walls which is 60°.

The piston rings which had included angles of 60° and 80° were subject more to the formation of oxidized layers in the deposited layer close to the side walls of the annular groove than the central portion of the deposited layer, while the rings which had included angles of 100° and 120° between the side walls of the groove were not subject to oxidized layers anywhere in the rings, and proved to be satisfactory as piston rings. Microscopic examination of the cross-sections showed that, with the piston rings which had an angle of 60° and 80°, the deposited layer was more oxidized, and had finer particles, in the side portions, than in the central portion of the groove. FIG. 7 is a micrograph (X200) showing a cross-section of one of the piston rings which had an angle between the walls of the groove of 60°. On the other hand, in the piston rings which had included angles of 100° and 120°, the deposited layer was relatively uniform throughout. It is surmised that in the rings with included angles of 60° and 80° the presence of these oxidized layers and fine particles caused the adherence between the deposited layer and the piston ring preform mother metal to be reduced, during repeated heating and cooling cycles.

From the above described experimental results, it may be concluded that, in the Mo deposited piston rings, the cross-sectional shape of the annular groove has a lesser effect on the adherence characteristics of the deposited layers, but the quality of the deposited layer itself has a greater effect on the durability, while, on the other hand, in the Cr-C-Fe alloy deposited piston rings, the cross-sectional shape of the annular groove has a greater effect on the adherence characteristics, and the included angle of the walls of the groove, if less than 100°, reduces the adherence of the deposited layer to the side walls of the groove; while, if the included angle is greater than 100°, the adherence is not deteriorated.

Referring to FIGS. 1 and 3, it is seen that the bank portions A of the piston ring preform appear at and partially define the cylindrical outer surface of the piston ring, and accordingly, the larger the angle between the walls of the annular groove, the more rapidly the area of the exposed surface of the bank portion A increases as the cylindrical outer surface of the piston ring wears out during use. Thus, abrasion of the cylindrical outer surface of the piston ring causes the exposed surface of the bank portions to occupy more of the cylindrical outer surface, resulting in a piston ring which is poor in wear resistance and scuffing resistance. For example, in the bench test wherein piston rings which had an annular groove having an included angle of 120°, and an Mo layer deposited in the groove, were tested for 300 hours, some of the piston rings were abraded by 60 to 100 microns in thickness, on their cylindrical outer surface, and the exposed surface of the bank portions A increased in width from 0.4 mm to 0.6 mm, resulting in the decrease of the exposed portion of the Mo deposited layer from 1.7 mm to 1.3 mm. This implied that such a piston ring was poor in durability. Therefore, it is not thought that an included angle of more than 100° is suitable for Mo deposited piston rings.

On the other hand, with the Cr-C-Fe coated piston rings, the sliding outer surface of the ring had been abraded by as little as 15 to 20 microns during the 300 hour bench test, and the bank portions A had consequently increased little in width, which implies that good durability is assured, even in a piston ring which has a relatively thin deposited layer. From the above detailed experimental results and the fact that the deposited layer adheres well to the mother metal, it can be said that the included angle of the annular groove is preferably 100° or more. Furthermore, the good wear resistance of the Cr-C-Fe deposited layer enables the layer to be formed relatively thinner. The thinner is the deposited layer, the less depositing material is needed, and the less time is required for depositng the alloy and for grinding the deposited ring assembly. This reduces cost.

Figure 8:
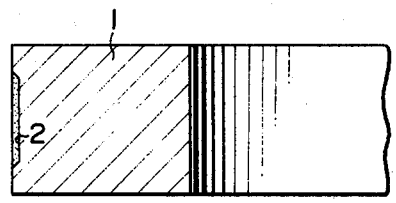
FIGS. 8 and 9 are radial cross sectional views of piston rings which have grooves with slightly modified cross sections.

The bottom of the annular groove may preferably be configured with certain slopes such as shown in FIG. 8. Because such a slanted bottom surface intersects the side walls at larger angles than would a flat bottom surface, more uniform adherence of the deposited layer may be attained. Alternatively, the groove may have a cross-sectional form like that shown in FIG. 9.

EXAMPLE III

Three piston rings X, Y, and Z were prepared as follows. The ring Z was made by shot-blasting a piston ring preform provided with an annular groove having an included angle of 120° between its walls, as shown in FIG. 8, on its cylindrical outer surface; plasma-spraying a 95% versus 5% mixture of Ni and Al metal powder into the groove surface, to a depth of 30 to 60 microns; subsequently plasma spraying Cr-C-Fe alloy powder onto this Ni-Al layer to a depth of 200 to 250 microns, the Cr-C-Fe alloy hving the same composition as that of Example I-1; and grinding the outer surface of the ring as before. For the purpose of comparison, the sample X was made by forming a piston ring preform with an annular groove of included angle 60°, as shown in FIG. 3; directly plasma-spraying Cr-C-Fe alloy powder of the same sort as before onto the surface of the annular groove (without depositing any first layer), and grinding the outer surface of the ring. The sample ring Y was made by forming a piston ring preform of the sort shown in FIG. 8, directly plasma-spraying the same Cr-C-Fe alloy onto the groove surface (without depositing any first layer), and then grinding the cylindrical outer surface of the resulting ring.

Figure 10:
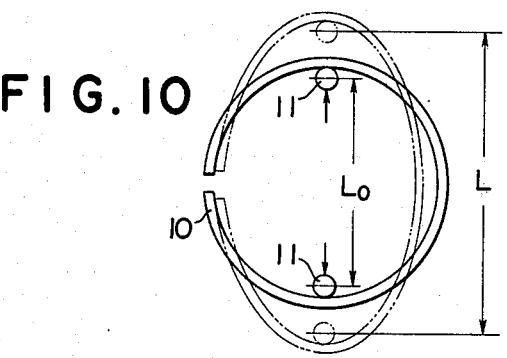
FIG. 10 is a schematic elevational view illustrating a testing process for testing adherence of the deposited layer of a piston ring to its mother metal.
Figure 11:
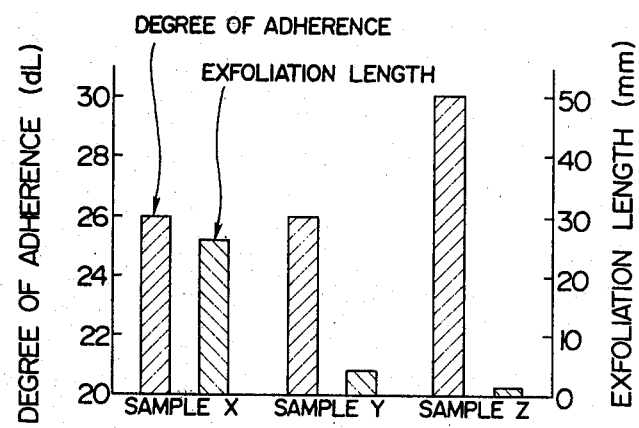
FIGS. 11 and 12 are graphs showing exfoliation length and degree of adherence of various samples.

All these samples were then tested for adherence of the deposited alloy to the mother metal, as shown in FIG. 10, by extending them elliptically on a jig 11. The value dL, which equals the post-test dimension L at which exfoliation occurred, minus the before-test dimension Lo, was defined as the adherence degree. As is shown in the graph of FIG. 11, in the sample X, the annular groove of which had included angle of 60°, the deposited layer exfoliated from the mother metal when dL was 26 mm, and the exfoliation length was as large as 26 mm, while in the sample Y, the annular groove of which had included angle of 120°, the deposited layer exfoliated from the mother metal when dL was 26 mm, but the exfoliation length was as little as 4mm. In the sample Z, it was not until dL was 30 mm that the deposited layer exfoliated from the mother metal, and the exfoliation length was as little as 1 to 2 mm.

Figure 12:
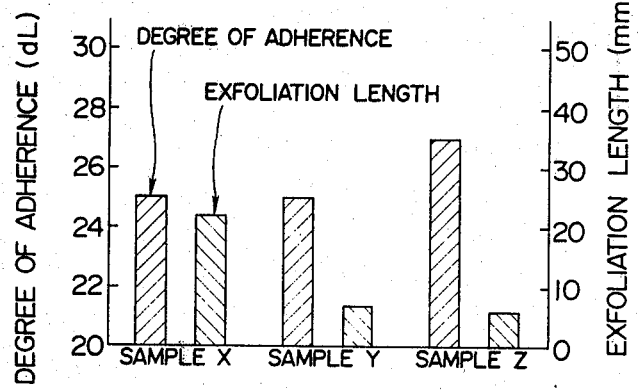

A similar test was performed in the same manner as that above described, after subjecting the alloy deposited piston rings to a 250 cycle thermal treatment. In each cycle the piston rings were heated by being maintained in an electric furnace for nine minutes, and were then dipped into water at room temperature. The samples, thus thermally treated, were tested as to adherence degree of the deposited layer in the same way as described above. The experimental results obtained, as shown in FIG. 12, demonstrate the same tendency as before. That is, in the sample X, an exfoliation occurred at the stage when dL was 25 mm, and the exfoliation length was as long as 22 mm; in the sample y, exfoliation occurred at the stage when dL was 25 mm, but the exfoliation length was as short as 7 mm; and in the sample Z it was not until dL reached 27 mm that the deposited layer began to exfoliate, and the exfoliation length was as short as 6 mm.

The object of first depositing the Ni-Al layer is to enhance the adherence of the deposited Cr-C-Fe layer to a piston ring preform that is made of cast iron. In a piston ring preform wherein a Mo sublayer is interposed between the preform and the Cr-C-Fe alloy deposited layer, the adherence characteristic is satisfactory before it is subjected to the abovementioned thermal treatment, but after this treatment the adherence characteristic is reduced, due to the oxidization of the deposited Mo layer. From the above described experimental results and consideration thereof, it can be concluded that preferably the sub-layer is formed of a material that has not only got excellent heat and oxidization resistance, such as Ni-Al composite, or alloys of Ni-Cr-Al or Ni-Cr, but also which adheres well to the piston ring preform.

While in the above the piston ring preforms are described as being made of nodular graphite cast iron, they could be formed of various other forms of cast iron, or of steel, such as stainless steel or the like.

Experiments have been made with the composition of the Cr-C-Fe alloy plasma-sprayed onto the piston ring preforms, and it has been discovered that if the Cr is below about 55%, or above about 70%, or if the C is below about 3%, or above about 9%, then the resulting piston rings are not durable. Although a certain percentage of Si is shown in the composition of Example I-1, furthermore, it has been discovered that this Si is not essential for the good results of the present invention. The same is true for the small amounts of P and S.

Figure 9:
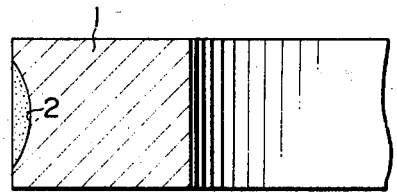

It is not though that the particular alloy of Cr, C, and Fe described herein is new in itself. However, its use in the particular circumstances of being plasma-sprayed into a groove in a piston ring preform, so as to make an inlaid piston ring, has not been previously anticipated, to the knowledge of the present inventors, and provides a piston ring of surprisingly good performance. FIG. 9 shows a modification of the annular groove 2 which is formed to have an arcuate cross sectional contour. This modification is advantageous in that it provides a large included angle theta, and has no sharp corners or edges in the groove; but it has the drawback of requiring more deposited alloy.

Although the present invention has been shown and described with reference to some preferred embodiments thereof, and with reference to the drawings, it should be understood that various changes and omissions could be made in the form and the content of any particular embodiment by a person skilled in the art, without departing from the principles of the present invention, or from its scope, which it is expressly desired should be defined, not by any purely fortuitous details of the embodiments shown, or of the drawings, but solely by the accompanying claims.

We claim:

1. A piston ring for use with a piston in an internal combustion engine prepared according to the process which comprises providing a cast iron piston ring preform having a circumferential groove dividing its cylindrical outer surface into two cylindrical parts, said groove having a configuration such that the side walls slope outward from the bottom of said groove to the outer cylindrical surface of said preform so as to establish an angle between said side walls of 100° or more, plasma-spraying said piston ring preform with a deposit of an alloy comprising 55–70% Cr, 3–9% C and the balance substantially Fe so that the groove is filled up, and machining the outer surface of the ring so that any deposit of alloy on the cylindrical outer surface of the preform is removed and the deposit of the alloy in the groove is made flush with the cylindrical outer surface of the preform, said alloy being substantially free of any significant carbide.

2. A piston ring for use with a piston in an internal combustion engine, comprising a cast iron piston ring preform having a circumferential groove dividing its cylindrical outer surface into two cylindrical parts said groove containing a plasma-sprayed sublayer formed of a mixture of Ni and Al on the bottom of said groove and a plasma-sprayed deposit on said sublayer of an alloy comprising 55–70% Cr, 3–9% C and the balance substantially Fe, said deposit substantially filling said groove such that its outer surface is flush with the cylindrical outer surface of said preform, and further so as said alloy is not deposited on the remaining outer surface of said preform, said groove having a configuration such that the side walls slope outward from the bottom of said groove to the outer cylindrical surface of said preform to establish an angle between said side wall of 100° more.

* * * * *